Sept. 17, 1968  A. S. NICHOLAS  3,401,980
HOUSING WITH PLATE ANCHOR
Filed July 19, 1967
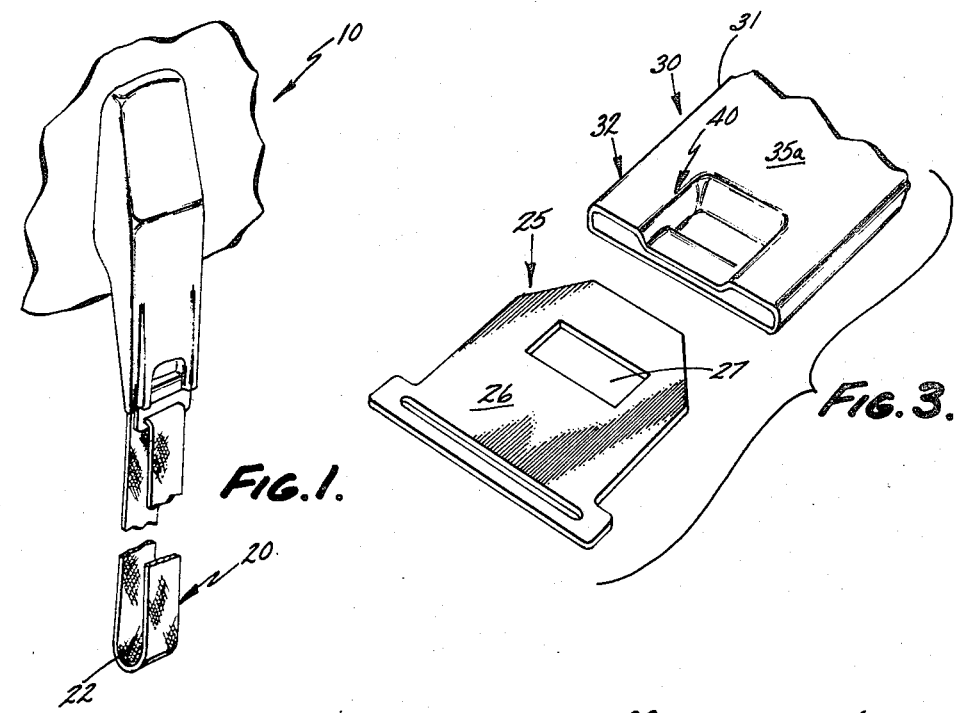
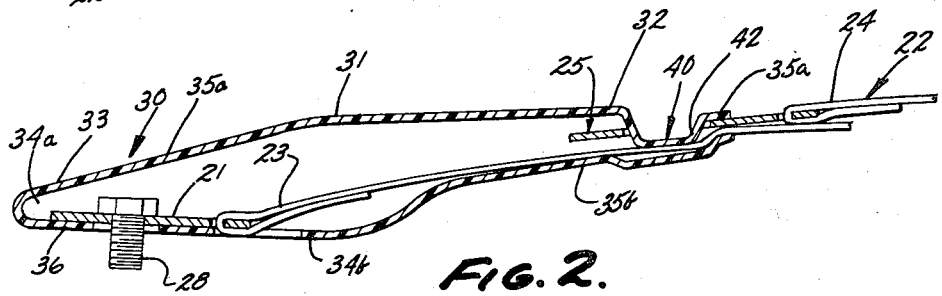
INVENTOR.
ARTHUR S. NICHOLAS
BY
ATTORNEYS

United States Patent Office 3,401,980
Patented Sept. 17, 1968

3,401,980
HOUSING WITH PLATE ANCHOR
Arthur S. Nicholas, Grand Rapids, Mich., assignor to Leon Chemicals & Plastics, Incorporated, Grand Rapids, Mich., a corporation of Michigan
Filed July 19, 1967, Ser. No. 654,525
7 Claims. (Cl. 297—389)

ABSTRACT OF THE DISCLOSURE

A safety belt terminal protector having an elongated unitary hollow jacket with a belt receiving portion and an anchor element receiving portion formed integrally, both said portions being oblong in cross section to have narrow edges and relatively wide faces and an open end for protrusion of the belt out of the jacket. One of the faces of the belt receiving portion is provided with a detent formed integrally therein. This detent projects into the space between the faces and serves to engage the aperture in the connector plate of the ordinarily free belt extremity when it is protruded into the opening in generally overlying relationship with respect to the belt.

Background

This invention relates to protective housings and, more particularly, to such housings especially adapted for enclosing portions of retaining belts utilized in automobiles or other types of vehicles. More particularly, this invention relates to such housings or jackets embodying novel means for storing the ordinarily free extremity of the belt when it is not in use.

One of the problems which has continually plagued the manufacturers, purchasers and occupants of vehicles such as automobiles is the storage and protection of seat or other types of restraining belts during those periods in which they are not securely fastened about an occupant. This problem has become particularly acute in light of the promulgation of recent governmental regulations requiring not only one or two but, sometimes, as many as six individual belt assemblies within a particular automobile. Certain of these regulations have been particularly aimed at the provision of over-the-shoulder harness configurations which, concededly, afford more protection on impact to the occupant than the conventional seat-belt arrangement. In these latter cases, the storage problems concern themselves not only with the protection of the belt webbing and the appearance of the interior of the vehicle but, additionally, with the undesirability of having a loose belt member with a relatively heavy metal end member free to "slap" about within the car, should an impact or other type of crash be experienced. Such "slapping," as will be readily appreciated by those skilled in the art, may under certain conditions cause more harm to the occupants of the vehicle than the actual crash itself.

Another problem which has been experienced primarily as a result of the provision of a larger number of belt assemblies and over-the-shoulder assemblies within the vehicle is the ease with which access may be gained to the proper belt extremity by an occupant after he has assumed the seated position. Where, as is the case with the conventional over-the-shoulder harnesses, one extremity is anchored to the automobile super structure above and to the rear of the occupant, the belt is usually of such length that the end will drop completely to the floor of the rear seat if it is not secured in accessible fashion to the occupant. When such occurs, it is necessary for the occupant to grasp the intermediate extremity of the belt and pull it in over-hand fashion or the like until he has reached the connector end. The frustrations experienced by the occupant in performing this task often result in his not fastening the restraining belt thereafter and, thus, their entire purpose is thwarted.

Objects and specification

It is an object of this invention, therefore, to provide a novel seat belt restraining member.

More particularly, it is an object of this invention to provide such a member or device which provides belt protecting storage and permits orderly organization of the interior of the automobile and, yet, which permits access to the seat belt by an occupant with maximum ease.

It is an object of this invention to provide such a device particularly adapted for utilization with the over-the-shoulder type of belt which is effective to prevent the belt fastener from "slapping" about the interior of the car should an accident occur when it is not being utilized to restrain a particular occupant.

It is yet another object of this invention to provide a device of the type described which combines the attributes of a commercially well-accepted restraining belt terminal protector into the integral structure which serves additionally as the retaining means.

Thus, it is an object of this invention to provide a retaining member which may be placed within the auto with little additional expense since all of the necessary basic components would be provided regardless of the presence of the retaining means.

These as well as other objects of this invention will be readily understood by reference to the following specification and accompanying drawings in which:

FIG. 1 is a fragmentary perspective view of a vehicle interior illustrating the novel belt retaining assembly;

FIG. 2 is a cross-sectional view through the anchor point of a belt terminal protector and the novel retaining means; and FIG. 3 is an exploded, perspective view of the retaining mechanism and belt extremity.

Briefly, this invention comprises a belt protector having a unitary hollow belt receiving jacket with an open end for protrusion of the belt thereout of. Means are associated with the jacket portion for receiving and retaining the fastener affixed to the belt when it is looped and the fastener brought into operative engagement therewith whereby the belt and fastener may be stored and retained in a relatively out-of-the-way position.

Referring now to the figures, a preferred embodiment of this invention will be described in detail. In FIG. 1 there is illustrated a rigid vehicular support position, indicated generally by the reference numeral 10, to which there is attached the belt assembly 20 by means of an orificed anchor element 21 and a bolt 28 (see FIG. 2). The support position 10 may be positioned above and to the rear of the particular occupant who is to utilize belt assembly 20 but, as will be apparent to those skilled in the art, the concepts of the instant invention may be utilized at other anchor positions with optimum feasibility depending upon the particular restraining belt layout of the vehicle interior.

Referring now additionally to FIGS. 2 and 3, the belt assembly 20 comprises a standard web-like belt 22 having an anchor end 23 connected to the orificed anchor element 21 and a mating end 24 suitably joined to connector element 25. In the embodiment illustrated, connector element 25 comprises a tongue-like metallic element 26 having a single aperture 27 in the face thereof. As will be readily appreciated by those skilled in the art, when the restraining belt is to be utilized, the tongue-like element 26 is slid into mating relationship with another belt section suitably anchored elsewhere on the vehicle and the aperture 27 engaged thereby to firmly secure the two-belt portions together.

In the preferred embodiment of this invention, the novel retaining assembly is formed integrally with terminal protector assembly 30. Preferably, the terminal protector assembly is fabricated in accordance with the teachings of application Ser. No. 499,726, filed Oct. 21, 1965, now Patent No. 3,305,266, and assigned to the same assignee as the instant invention. As may be more clearly understood by reference to the noted co-pending application, the terminal protector assembly 30 comprises an elongated jacket 31 having a belt receiving portion 32 and an anchor element receiving portion 33 formed integrally therewith. The belt receiving portion of the jacket 31 completely encloses the anchor end 23 of belt 22 and the belt protrudes from a suitable opening therein. The anchor end 23 of the belt is enclosed by edges 34a and 34b and faces 35a and 35b. The anchor element receiving portion 33 is provided with a flexible flap or tongue, indicated generally by the reference numeral 36, which serves as a gasket for anchor element 21 and a means whereby the terminal protector assembly 30 may be retained in position. The bolt 28, as will be readily apparent by reference to the co-pending application noted above, passes through a suitable aperture in the anchor element 21 and a similar aperture in the flexible flap 36 and is secured into the vehicular support in a conventional manner.

In accordance with the concepts of this invention, the face 35a of belt receiving portion 32 is provided with one or more detents 40 protruding into the space between faces 35a and 35b. The number of such detents 40 will be determined ordinarily, of course, by the number of apertures 27 in the connector element 26. It has been found that a single detent properly aligned is usually sufficient to retain the connector element 26. The tongue-like element 25 is slid into the open end of belt receiving portion 32 of jacket 31, detent cams upwardly and then snaps into mating relationship with aperture 27 to retain the belt in the position shown in FIG. 1 when it is not in use. In this position the anchor end 23 and mating end 24 of belt 22 lie in generally overlapping or looped relationship with respect to one another and the tongue-like element 26 lies in closely overlying relationship with respect to that portion of belt 22 within jacket 31 which is below detent 40.

Assuming, for example, that the position 10 within the vehicle represents a portion of an automobile super structure above and to the left and rear of the driver, the belt may be affixed in its retained position after used by the driver by merely turning around and sliding tongue-like element 26 into jacket 31 until detent 40 engages aperture 27. When it is desired to remove the belt from its storage position for restraining use, it is necessary merely to grasp that section of the belt adjacent connector element 25 and pull the aperture 27 free from engagement with detent 40. The provision for such removal requires that the jacket be formed of materials sufficiently flexible to allow it to give under the withdrawing pressure and permit the detent 40 to cam out of the recess in a manner identical to that in which it was inserted. On the other hand, the jacket should be sufficiently rigid that it does not bend or distort under the influence of tongue-element 26 when it is attempted to slide it into storage position. To assist in insertion and removal of the tongue section, the leading and rearward edges of detent 40 may be slightly sloped as indicated at 42 to provide the necessary camming action.

While a preferred embodiment of this invention has been illustrated in detail, it will be readily apparent to those skilled in the art that other embodiments may be conceived and fabricated without departing from the spirit of this specification and the accompanying drawings.

I claim:

1. In a safety belt terminal protector having an elongated unitary hollow jacket having a belt receiving portion and an anchor element receiving portion integral therewith, both said portions being oblong in cross section to have narrow edges and relatively wide faces and an open end for protrusion of said belt out of said jacket, the improvement comprising: means associated with said belt receiving portion for receiving and retaining the fastener affixed to said belt when said belt is looped and the fastener brought in operative engagement therewith, whereby said belt and fastener may be stored and retained in a relatively out-of-the-way position.

2. The protector as set forth in claim 1 wherein said receiving means comprises detent means protruding inwardly from one of the faces of said jacket, said detent means being adapted to engage an aperture in said fastener when said fastener is protruded into said open end in overlying relationship with respect to said belt.

3. The protector as set forth in claim 1 wherein said detent means is integrally formed with said jacket.

4. The protector as set forth in claim 3 wherein said jacket is formed from material of sufficient flexibility to permit the release of said detent means from said fastener in response to a withdrawing thrust exerted on said fastener.

5. The protector as set forth in claim 4 wherein said detent means has sloping forward and rearward edges to facilitate insertion of said fastener into said belt receiving portion and removal therefrom.

6. In a safety belt protector having a unitary hollow belt receiving jacket with an open end for protrusion of said belt out of said jacket, the improvement comprising: means associated with said jacket portion for receiving and retaining the fastener affixed to said belt when said belt is looped and the fastener brought in operative engagement therewith, whereby said belt and fastener may be stored and retained in a relatively out-of-the-way position.

7. The protector as set forth in claim 6 wherein said receiving means comprises detent means protruding inwardly from one of the faces of said jacket, said detent means being adapted to engage an aperture in said fastener when said fastener is protruded into said open end in overlying relationship with respect to said belt.

References Cited
UNITED STATES PATENTS

| | | | |
|---|---|---|---|
| 3,046,056 | 7/1962 | Greene et al. | 297—385 |
| 3,126,228 | 3/1964 | Greene et al. | 297—385 |
| 3,171,688 | 3/1965 | Nicholas | 297—388 |
| 3,175,862 | 3/1965 | Robbins | 297—385 |
| 3,258,293 | 6/1966 | Sharp | 297—389 |
| 3,298,739 | 1/1967 | Scruggs | 297—389 |
| 3,305,266 | 2/1967 | Nicholas et al. | 297—385 |
| 3,318,634 | 5/1967 | Nicholas | 297—385 X |

JAMES T. McCALL, *Primary Examiner.*